No. 830,580. PATENTED SEPT. 11, 1906.
C. F. FAES.
RAKE.
APPLICATION FILED AUG. 28, 1905.
2 SHEETS—SHEET 2.
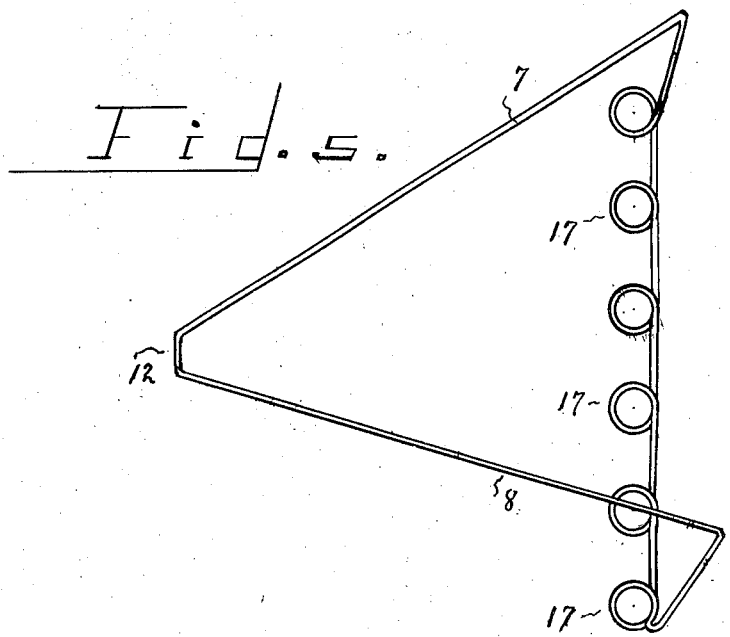

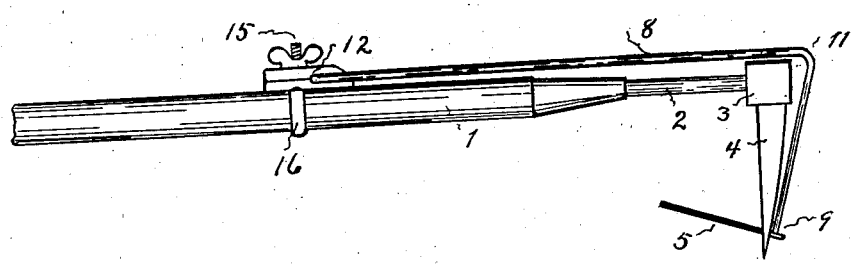
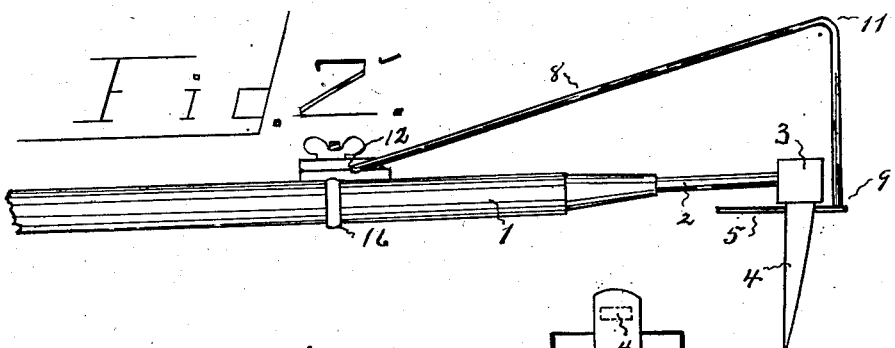
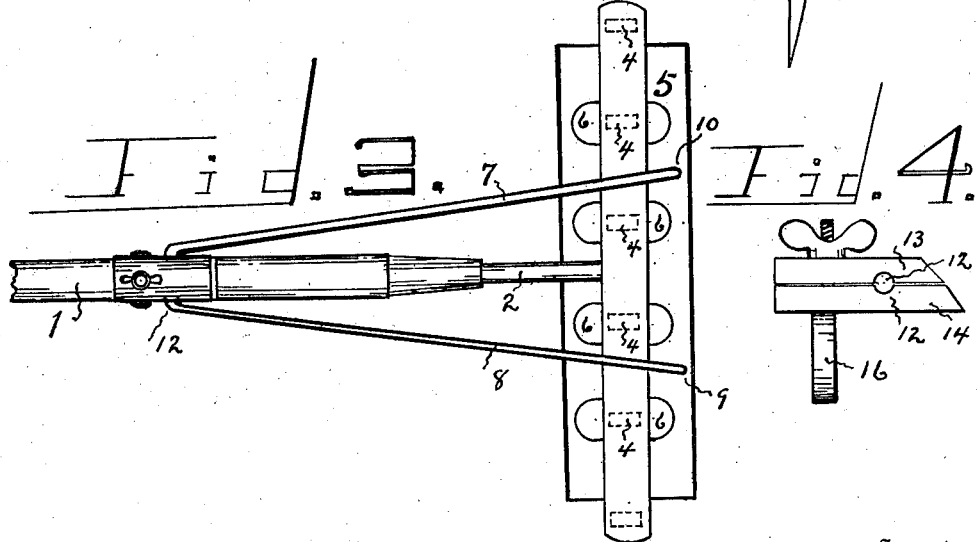

UNITED STATES PATENT OFFICE.

CHARLES F. FAES, OF MADISON, NEBRASKA.

RAKE.

No. 830,580.   Specification of Letters Patent.   Patented Sept. 11, 1906.

Application filed August 28, 1905. Serial No. 275,996.

*To all whom it may concern:*

Be it known that I, CHARLES F. FAES, a citizen of the United States, residing at Madison, in the county of Madison and State of Nebraska, have invented certain new and useful Improvements in Rakes, of which the following is a specification.

My invention relates to improvements in rakes adapted for use as hand-rakes for gardening purposes, and has for its object the presentation of a means to prevent the clogging of leaves, roots, or other substances between the teeth of the rake while in use.

Another object is the production of a rake which may easily be constructed for the purposes intended and which is economical as to cost.

With these objects in view my invention consists of novel construction and arrangement of parts as described herein, and as illustrated by the drawings, wherein—

Figure 1 represents a vertical side view of my invention, the plate-frame and tooth-plate being in a lowered or normal position. Fig. 2 is a variation of Fig. 1, showing these parts in an elevated position. Fig. 3 represents a top view of my invention. Fig. 4 is a detail of a device for mounting the frame upon the rake-handle; and Fig. 5 illustrates a different manner of forming the tooth-plate, it being a modification of my invention.

The garden-rake is so familiar that its various uses need not be described further than to explain that the spaces between the teeth become obstructed with old vines, leaves, manure, pieces of wood or rock, or other substances, and in order to avoid the waste of time and annoyance common to its use I construct the parts described, and in the drawings the numeral 1 represents the handle; 2, the shank; 3, the rake-head, and 4 the teeth of a garden-rake not unlike those in common use, the rake-head preferably being constructed of metal and the teeth constructed integral therewith, the wide portion of the teeth being disposed transversely thereon, so as to offer the least resistance to movement through the soil while in use.

I construct a tooth-plate 5 of generally rectangular form, preferably of thin metal, of convenient width and of a length nearly that of the rake-head, and construct therein the openings 6, these openings being adapted to surround all except the end teeth of the rake, and I construct the arms 7 and 8 to form a plate-frame constructed, preferably, of a metal rod, each end of which is rigidly mounted upon the tooth-plate at 9 and 10 in a manner so that the tooth-plate will be practically balanced as to its length, the loop formed by these arms being bent to pass over the rake-head at 11, Figs. 1 and 2, and passing convergingly to the pivotal mounting upon the rake-handle at 12. The arms as thus mounted have a limited radial swing upon the pivotal support at 12, the movement being in one direction until the arms come in contact with the outer wall of the rake-head, as shown in Fig. 1, and in the opposite direction until the tooth-plate 5 contracts with the inner wall of the rake-head, as shown in Fig. 2.

In order that the tooth-cleaning piece 5 may be readily attached or detached from the rake-handle, I employ the fastening device shown, consisting of the plates 13 and 14, compressed by the thumb-nut 15, all mounted upon the grooved shank of the ring 16, this affording a compression means very effective and economical in construction.

The rake is used in the ordinary manner, and when the rake is drawn toward the operator and as the teeth sink into the soil at the time of such movement the tooth-cleaning piece 5 rides upon the soil-surface and gradually rises as the teeth sink deeper, since the approaching edge of the tooth-piece is inclined upwardly. As the rake is withdrawn from the soil, any substances which may have lodged between the teeth drop out of engagement, since the tooth-cleaning piece by a radial movement drops downward by its own weight, and if any obstruction has become firmly wedged between the teeth the operator may invert the rake-head, so that the teeth are uppermost, and by striking the rake-head and arms upon the ground such obstruction is effectively removed and always without touching the obstruction with the hand. I find the invention very useful for gardening purposes and also for raking the leaves from a lawn. While I show the end teeth of the rake as not inclosed entirely by the tooth-piece in Figs. 1, 2, and 3, a construction, of course, could be employed completely inclosing the teeth.

Fig. 5 shows a modification in the matter of the tooth-cleaning piece 5, it being constructed by use of an endless metal hoop which forms the arms 7 and 8 and is repeatedly coiled so as to accommodate within each coil one of the several rake-teeth. A wire rod or any metal rod may be formed in this manner as a substitute for the arms and tooth-piece shown in Figs. 1, 2, and 3, the spiral loops 17 answering to the openings 6 shown in said figures and adapted to contain the teeth of the rake, and a convenient welding could be made at 12, where the frame is mounted upon the rake-handle. The construction as shown by this modification is very economical in manufacture.

What I claim as my invention is—

1. A rake, provided with apertured compression-plates mounted upon the rake-handle; an expelling-plate disposed lengthwise of the rake-head and having a series of tooth-inclosing apertures formed therein; angularly-bent arms rigidly mounted upon said expelling plate and extended over the rake-head convergingly, to make a closure within said apertured compression-plates.

2. A rake, provided with apertured compression-plates removably mounted upon the rake-handle; an expelling-plate disposed lengthwise of the rake-head and having a series of tooth-inclosing apertures formed therein; angularly-bent arms rigidly mounted upon said expelling-plate and extended over the rake-head convergingly to make a closure within said apertured compression-plates.

3. A rake, provided with the tooth-plate 5 having tooth-inclosing openings 6 formed therein, the arms 7 and 8 mounted at 9 and 10 upon said tooth-plate, and bent angularly at 11 to extend convergingly and have a pivotal mounting at 12 between plates 13 and 14; and the clip 16 provided with the thumb-screw 12 adapted to cause a compression of plates 13 and 14, substantially as shown and described.

In testimony whereof I now affix my signature in presence of two witnesses

CHARLES F. FAES.

Witnesses:
H. FRICKE, Jr.,
S. J. ARNETT.